US009858677B2

United States Patent
Romanenko

(10) Patent No.: US 9,858,677 B2
(45) Date of Patent: Jan. 2, 2018

(54) METHOD OF IMAGE ANALYSIS

(71) Applicant: Apical Ltd, Cambridge (GB)

(72) Inventor: Ilya Romanenko, London (GB)

(73) Assignee: Apical Ltd., Cambridge (GB)

( * ) Notice: Subject to any disclaimer, the term of this patent is extended or adjusted under 35 U.S.C. 154(b) by 0 days.

(21) Appl. No.: 14/844,924

(22) Filed: Sep. 3, 2015

(65) Prior Publication Data

US 2016/0070988 A1 Mar. 10, 2016

(30) Foreign Application Priority Data

Sep. 5, 2014 (GB) .................................. 1415790.3

(51) Int. Cl.
| | |
|---|---|
| G06T 7/20 | (2017.01) |
| G06K 9/62 | (2006.01) |
| G06K 9/32 | (2006.01) |
| G06T 7/246 | (2017.01) |
| G06K 9/00 | (2006.01) |

(52) U.S. Cl.
CPC .............. *G06T 7/20* (2013.01); *G06K 9/3241* (2013.01); *G06K 9/6256* (2013.01); *G06T 7/248* (2017.01); *G06K 9/00261* (2013.01); *G06T 2207/20081* (2013.01); *G06T 2207/30201* (2013.01)

(58) Field of Classification Search
CPC . G06T 7/20; G06T 7/204; G06T 2207/20081; G06T 2207/30201; G06K 9/6256; G06K 9/3241; G06K 9/00261
See application file for complete search history.

(56) References Cited

U.S. PATENT DOCUMENTS

| | | |
|---|---|---|
| 2008/0095398 A1 | 4/2008 | Yoshinaga et al. |
| 2010/0226564 A1 | 9/2010 | Marchesotti et al. |
| 2011/0251896 A1* | 10/2011 | Impollonia ............ G06Q 30/02 |
| | | 705/14.55 |
| 2012/0076361 A1 | 3/2012 | Fujiyoshi |

(Continued)

FOREIGN PATENT DOCUMENTS

WO 2013037702 A1 3/2013

OTHER PUBLICATIONS

Babenko, Boris, Ming-Hsuan Yang, and Serge Belongie. "Robust object tracking with online multiple instance learning." IEEE Transactions on Pattern Analysis and Machine Intelligence 33.8 (2011): 1619-1632.*

(Continued)

*Primary Examiner* — Bhavesh Mehta
*Assistant Examiner* — Menatoallah Youssef
(74) *Attorney, Agent, or Firm* — EIP US LLP

(57) ABSTRACT

A method to analyze an image and determine whether to output image data associated with an area of the image is provided. An object detection algorithm using training image data to detect an object based at least in part on a similarity of appearance of image data to data derived from the training image data is provided. Weakly detected objects are classified based on characteristics associated with the weakly detected object and may be added to the training image dataset for use in further training of the object detection algorithm. The object detection algorithm is trained with a revised dataset, the revised dataset being updated with data generated by the object detection algorithm.

14 Claims, 7 Drawing Sheets

(56) References Cited

U.S. PATENT DOCUMENTS

2014/0247963 A1   9/2014   Lin et al.

OTHER PUBLICATIONS

Pavani, Sri-Kaushik, et al. "An Experimental Evaluation of Three Classifiers for Use in Self-Updating Face Recognition Systems." IEEE Transactions on Information Forensics and Security 7.3 (2012): 932-943.*

Kim, Tae-Kyun, et al. "Online multiple classifier boosting for object tracking." 2010 IEEE Computer Society Conference on Computer Vision and Pattern Recognition—Workshops. IEEE, 2010.*

* cited by examiner

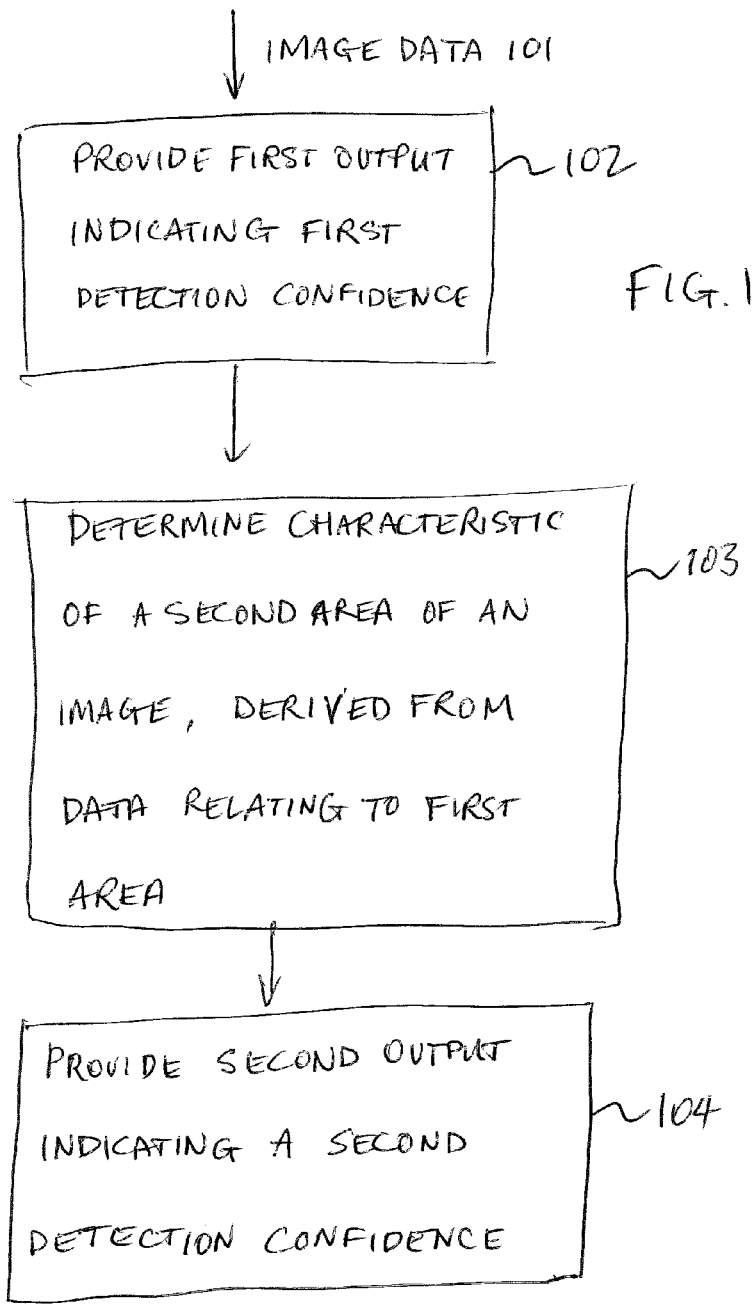
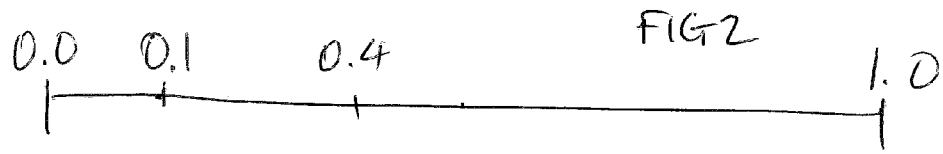

METHOD OF IMAGE ANALYSIS

CROSS-REFERENCE TO RELATED APPLICATIONS

This application claims priority under 35 U.S.C. §119(a) and 37 CFR §1.55 to UK Patent Application No. 1415790.3, filed on Sep. 5, 2014, the entire contents of which are incorporated herein by reference.

BACKGROUND OF THE INVENTION

Field of the Invention

The present invention relates to a method of analyzing an image and determining whether to output image data associated with an area of the image. Such image data can be used in further training of the object detection algorithm.

Description of the Related Technology

Object detection algorithms can be used to detect and track objects in images, such as still or live video, for example as captured by an image sensor in a digital camera.

Detecting and tracking objects can be based on classifier models derived through off-line training. In one such approach, a positive and negative dataset is created, consisting of a large number of examples in which the object of interest is respectively present or absent.

A large sample set of the object of interest may be required to allow adequate performance. Also, variations in the conditions of the actual capture environment may reduce accuracy. For example, in the case of face detection, it is common to train a classifier based on examples of human faces viewed at eye level. However, in some applications it is desirable to place a camera at an elevated angle, which reduces the accuracy of face detection, leading to increased false positives and negatives with respect to a camera positioned at eye level.

One approach to overcoming these issues is to manually create a number of training datasets and train a classifier for each set, producing a number of models each optimized to a given environment. However, this requires the generation of additional large sample datasets, which in turn involves significant human intervention in selecting and annotating the dataset elements. Also, in the case of elevated camera positions, it is difficult for a human to select the appropriate positive and negative training sets manually due to the variation in e.g. facial proportions as a function of elevation angle. Improving an existing dataset similarly involves large amounts of human effort.

SUMMARY

According to a first aspect of the present invention, there is provided a method comprising detecting the presence of an object in at least one image using an object detection algorithm that uses training image data to train the detection algorithm to detect an object based at least in part on a similarity of appearance of image data in a first area of an image to data derived at least in part from the training image data, the method comprising:

providing a first output indicative of a relatively high similarity of appearance of at least part of a first area of an image to data derived at least in part from the training image data, the first output indicating that a first detection confidence is sufficiently high to indicate that a first object is likely to have been detected in the first area of an image;

determining a characteristic of a second area of an image in which an object may be detected, the characteristic being derived from data relating to the first area and being capable of indicating a likelihood of presence of a second object in the second area; and based on the determined characteristic, and a similarity of appearance of at least part of the second area to data derived at least in part from the training image data, providing a second output indicating that a second detection confidence is sufficiently high to indicate that the second object is likely to be present in the second area.

The first object and the second object can be the same object or different objects.

Preferably, the characteristic is based at least partly on a proximity of the second area to an estimated position of the second object within an image.

Preferably, the method comprises estimating the position based on tracking of movement of the object within a sequence of images.

Preferably, the position includes a trajectory, or a region of an image.

In some aspects, the characteristic is based at least partly on a size of the object to be detected, at least partly on a shape of the object to be detected, at least partly on a proximity of the first area to the second area, at least partly on a relative position of the first area to the second area, and/or at least partly on color information associated with the first object.

The first and second areas can be in the same image or different images.

Preferably, the method comprises outputting image data associated with the second area of the image.

The image data can include a region of the image that does not contain the second object. The image data can comprise at least image data from the second area.

The image data can comprise image data from an area cropped from an image, the area containing the second region.

The image data can be outputted for use in further training of the object detection algorithm.

The method can comprise adding the outputted image data to a dataset that is used to train the object detection algorithm, thereby to generate a revised dataset. Additionally, the method can comprise training the object detection algorithm with the revised data dataset, thereby to generate a revised trained object detection algorithm.

A performance of the object detection algorithm can be tested against that of the revised trained object detection algorithm.

In another aspect, the method comprises:

attempting to detect the presence of an object in an image using an object detection algorithm; and responsive to the detection algorithm weakly but not strongly detecting the object, determining, based on at least one characteristic associated with the weakly detected object, whether to output image data associated with the weakly detected object for use in further training of the object detection algorithm.

Preferably, the method includes outputting the image data for use in the further training.

In an aspect, the method comprises retraining the models used by the detection algorithm based on the outputted image data.

In an aspect, the method comprises iterating the retraining until the models are optimized. The models are optimized when further iterations do not increase accuracy of detection.

In another aspect, there is provided a method of improving performance of an object detection algorithm that is trained using a dataset, comprising:

adding to the dataset image data related to an object that is weakly but not strongly detected in an image by the object detection algorithm, thereby to generate a revised dataset;

training the object detection algorithm with the revised dataset, thereby to generate a revised trained object detection database.

Preferably, the method comprises testing whether performance of the revised trained object detection database is improved relative to that of the object detection database. The testing can be based on determining a change in the number of strong detections and the number of weak detections of the object. Several other aspects are described in the following detailed description and claims.

BRIEF DESCRIPTION OF THE DRAWINGS

Further features and advantages of the invention will become apparent from the following description of preferred embodiments of the invention, given by way of example only, which is made with reference to the accompanying drawings.

FIG. 1 shows a method for attempting to detect the presence of an object.

FIG. 2 shows a scale indicating weak and strong detection thresholds.

DETAILED DESCRIPTION OF CERTAIN INVENTIVE EMBODIMENTS

Figure 3:
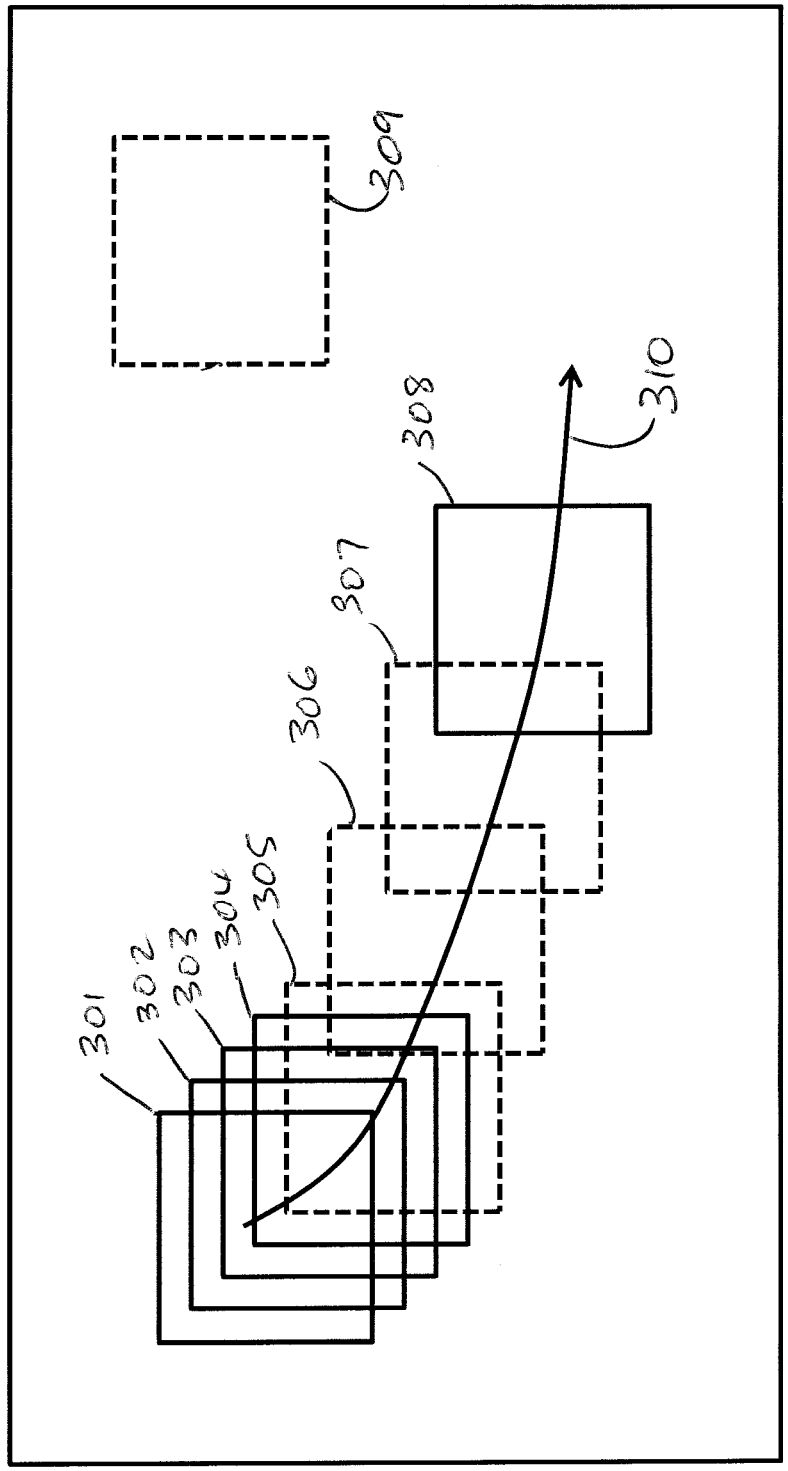
FIG. 3 shows an overlaid time-lapse image showing the movement of a detected object within a series of images from a video stream.

Image analysis techniques may be applied to pre-recorded still images or video stored in memory, and also to real-time images or video, for example shot by a camera. The images or video may be the result of image processing within a camera module or may consist of the raw data stream, e.g. output by a CMOS or CCD sensor. The image or video stream may be analyzed to produce data relating to the content of the image or video, such as metadata. For example, an object detection algorithm may be applied to identify or detect objects present in the image or video stream. Multiple objects may be detected and/or identified in the image or video stream.

Examples of the information that may be generated by an object detection algorithm include an identifier for each object, the location and size of each object within the image or video frame, the object type (for example "person" or "dog"), parts of the object (for example, "head", "upper body") and their angles of orientation, a detection score describing the accuracy of the detection, and an indication of the most probable orientation angle for each object (for example, distinguishing a human face oriented towards the camera from one oriented to the side).

As described above, the detection algorithm can output several types of information about objects it detects. One or more of these pieces of information can indicate how strongly an object has been detected within the image. In a preferred embodiment, the object detection algorithm outputs a detection score describing the accuracy of the detection of each potential object. In general, this detection score is compared with a detection threshold to determine whether an object is considered to formally have been "detected" by the object detection algorithm. The detection threshold is typically an empirically derived value that optimizes object detection based on a particular dataset (or set of datasets) that was used to train the object detection algorithm.

An object detection algorithm can produce one or more classifier model vectors via offline training. The training is performed based on a large dataset of examples of the object of interest, together with a set of examples that do not contain the object. The datasets are typically generated with at least some human intervention. Training of such object detection algorithms is understood by those skilled in the art, and so is not described here in detail.

In use, a feature extractor of the object detection algorithm is applied to an image. The feature extractor may analyze the image based on a histogram of oriented gradients. The output of the feature extractor is compared to the classifier model, for example by using a support vector machine. The overlap or scalar product between the feature vector and the model vector represents a detection score that, when compared with a predetermined threshold, can be used to determine the presence or absence of the object at a particular location within the image. The threshold is empirically derived in order to maximize the rate of true positive detections while minimizing the rate of false positive and negatives. A typical threshold value is 0.5.

A measure of the quality or completeness of a particular dataset can be obtained by applying the classifier to the set of positive and negative images in the training dataset and measuring the degree of separation (number of false positives and negatives) obtained. A high degree of separation with a large number of support vectors can indicate a well-trained model. However this measure is not sufficient to yield a reliable measure of the accuracy of the models as applied to unknown video sequences.

FIG. 1 shows a method according to one embodiment, in which an image or series of images (e.g., a video stream) may be analyzed. The invention will be described with reference to embodiments involving analysis of a series of images or frames, such as a video stream. However, it will be understood by the skilled person that many of the described embodiments involve techniques that can be applied to individual images, such as those generated by a digital still camera or extracted from a video stream.

A source, for example a camera producing live footage or a memory in which a video file is stored, provides image data 101. The image data is analyzed by way of an object detection algorithm in an attempt to detect the presence of an object. The object detection algorithm can be of any of the types described above, although other algorithms can be used. The object detection algorithm uses training image data to train the detection algorithm to detect an object based at least in part on a similarity of appearance of image data in an area of an image to data derived at least in part from the training image data.

A first output indicative of a relatively strong similarity of appearance of at least part of a first area of an image to data derived at least in part from the training image data is output 102. The first output indicates that a first detection confidence is sufficiently high to indicate that an object is likely to have been detected in the first area of an image. The first output can be, for example, an indication that an object has been detected in at least part of the first area with a detection score that is above a detection threshold.

A characteristic of a second area of an image in which an object may be detected is determined 103. The characteristic is derived from data relating to the first area and is capable of indicating a likelihood of presence of a second object in the second area.

A second output is provided 104 based on the determined characteristic and a similarity of appearance of at least part of the second area to data derived at least in part from the training image data. The second output indicates that a second detection confidence is sufficiently high to indicate that the second object is likely to be present in the second area.

The second output can take the form of an indication that the second area is of potential interest for use in training the object detection algorithm.

As described in more detail below, the characteristic can be any of a number of factors, including, but not limited to:

A proximity of the second object to an estimated position of the object within the image containing the second area.

Relative sizes of the second object and the first object.

Shapes of the second object and the first object (or the object detected in the first area).

Proximity of the second object to the first object, wherein the first and second objects areas are associated with the same multi-class object.

Colors of the second object and the first object.

The correlation can also be performed based on several characteristics in a combined fashion. Also, in some cases the characteristics may be inferred from a corresponding characteristic of the object's corresponding area. For example, the position of an object may be inferred from the position of the area in which it is located, which could be a bounding box generated by the algorithm for example.

The above characteristics are merely examples. Any characteristic that is capable of indicating a likelihood of presence of a second object in the second area may be chosen.

Estimated Position

In an embodiment applied to a typical video sequence where an object is moving from frame to frame, the object detection algorithm outputs a detection score that varies from frame to frame for the object. For example, the object may have a higher detection score in certain frames and a lower detection score in others. If the detection threshold is lowered such that detections having lower scores are regarded as true detections, the number of false positive detections increases. Conversely, if the detection threshold is increased, the number of false negative detections increases.

To address this issue, a tracking algorithm may be applied to the per-frame detections. This typically involves predicting a position of the object and optionally the object geometry in a particular frame, based, for example, on motion in other frames (such as preceding and/or succeeding frames in particular). Typical methods for such predictions include motion vector extraction, optical flow, and use of Kalman or Particle filtering. These methods can produce an estimated trajectory along which the object is predicted to lie.

Using this information, a per-frame detection which is weak, e.g., below a threshold for the presence of the object, may be reclassified as strong if it lies along the predicted trajectory and in addition matches predicted object features, such as size, orientation, or color. More generally, the probability of the presence of the object at a location may be determined as a function of the score of the object detection algorithm and its location in relation to the object trajectory determined by the tracking algorithm.

Turning to FIG. 3, there is shown a series of areas in the form of bounding boxes 301-309, representing objects identified by an object detection algorithm over nine images in the form of video frames. Bounding boxes 301-304 and 308 have solid lines, which indicate that the object detection algorithm has determined that a first detection confidence is sufficiently high to indicate that an object is likely to have been detected in an area of an image. Bounding boxes 305-307 and 309 have dotted lines, which indicate that the detection algorithm has determined that a second detection confidence is sufficiently high to indicate that the object which may be detected in an area is likely to be present in that area of an image. In both cases, the object detection algorithm determines a similarity of appearance of image data in an area of an image to data derived at least in part from the training image data that was used to train the object detection algorithm.

Line 310 is an estimated position of the object, in the form of a predicted trajectory of the object represented by bounding boxes 305-307 over time. The predicted trajectory 310 is shown as a single line, suggesting that in this case the trajectory is static over the course of the images being analyzed. The skilled person will appreciate that the trajectory may be updated for each image, or based on a subset of the images. A time-lapse overlay in that event would show a series of trajectories.

The characteristic determined in this embodiment is a proximity of each of the objects represented by, for example, bounding boxes 305-307 and 309 to the estimated trajectory 310 (which is the second area described above). The position represented by trajectory is derived from position data relating to one or more of the solid bounding boxes. Based on the determined characteristic, and a similarity of appearance of at least part of each dotted bounding box to data derived at least in part from the training image data, a second output is provided in the form of an indication that a second detection confidence is sufficiently high to indicate that the second object is likely to be present in the second area.

In practice, this second output results in a decision to output image data for use in further training of the object detection algorithm. For example, each of bounding boxes 305-307 is on or relatively close to the trajectory 310. On this basis, the positional relationship between each of bounding boxes 305-307 and, say, bounding box 304 results in a second output indicating that a second detection confidence is sufficiently high to indicate that the object which may be detected in the each of bounding boxes 305-307 is likely to be present in each of those bounding boxes respectively.

Bounding box 309 is some distance from the trajectory 310. Accordingly, there will be no indication that a second detection confidence is sufficiently high to indicate that the object is likely to be present in bounding box 309.

Whether a weakly detected object is sufficiently close to the trajectory can be based on any suitable technique. A simple technique is to determine a linear distance of a center of the bounding box (often already known as an output of an object detection algorithm) to the estimated trajectory. If the trajectory includes an estimated point or section at which the object is predicted to be, proximity can be measured based on that point or section. If the position is a region instead of a trajectory, the linear distance can be measured from the center of the bounding box to an edge or center of the region. If the position is a point, the linear distance can be measured to that point. The distance can be weighted, with increasing weights being applied the closer the bounding box is to the position. It will be understood that any other convenient determination of proximity can be used.

It should be noted that the position of an object can be considered to be the position of its associated bounding box. This may be convenient in object detection algorithms that use such bounding boxes.

In one embodiment, the method involves estimating the position. This can involve analyzing at least one other image in a sequence of images (such as other video frames, where video is being analyzed). Commonly, images that precede or succeed the image being analyzed in time are analyzed. The analysis can, in any event, involve determining, in another image, a position of the object that is to be detected in a current image, and using that position to estimate a likely position of the object in the current image. Positions can be determined for multiple other images, which can increase the accuracy of the position estimation for the object in the image being analyzed.

In the remaining examples, the term "weakly detected" is used to refer to a situation in which the appearance of at least part of the second area has a relatively low strength of similarity of appearance to data derived at least in part from the training image data. Similarly, the term "strongly detected" is used to refer to a situation in which there is a relatively strong similarity of appearance of at least part of a first area of an image to data derived at least in part from the training image data, indicating that a first detection confidence is sufficiently high to indicate that an object is likely to have been detected in the first area of an image. Referring to FIG. 2, for example, an object may be weakly detected if it has a detection score above 0.1 but below 0.4, and is strongly detected if it has a detection score equal to or exceeding 0.4.

References to "objects" may also include the area associated with the object. For example, "object size" may also include the size of the area within which the object was detected.

Object Size

The characteristic can be object size. If the size of a weakly detected object is similar to that of a strongly detected object in other images, then it may be determined that image data associated with the weakly detected object should be output for use in further training of the object detection algorithm.

Sizes may be determined in any convenient manner. When the object detection algorithm applies several scales during its analysis, the scale with the highest score for the weakly detected object can be compared with the scale giving the highest score for an object in another image. For example, there may be five scales in use for recognizing a face. If a face is strongly detected in one image based on the third scale, then the comparison may involve determining whether a weakly detected face in the next image is also detected based on the third scale. If the weakly detected face is detected based on the fifth scale, say, then the comparison will fail. An advantage of this approach is that the scale information is available as a result of the object detection algorithm being applied.

It will be understood that where many scales are in use, the comparison may not require that the weakly detected object was detected based on exactly the same scale as the strongly detected object. It may be acceptable if the scale for the weakly detected object is within some number of the scale for the previously detected object. For example, if twenty scales are used by the object detection algorithm, it may be acceptable for the scale for the weakly detected object to be within, say, two scales of the scale for the object in a previous image. For example, if the scale for the object strongly detected in the previous image is 10, then the comparison may be affirmative if the scale for the weakly detected object is any one of 8-12.

It will also be understood that weightings may be applied, such that the closer the scale for the weakly detected object is to that of the strongly detected object, the greater significance it is given.

Object Shape

The characteristic can be object shape. If the shape of the weakly detected object is similar to that of an object strongly detected in other images, then it may be determined that image data associated with the weakly detected object should be output for use in further training of the object detection algorithm.

Shapes may be determined in any convenient manner. When the object detection algorithm applies several classifier models during its analysis, the classifier model giving the highest score for the weakly detected object can be compared with the classifier model giving the highest score for an object in another image. For example, an object detection algorithm can have a classifier model for each of:
 a forward-looking face
 a leftward-looking face
 a rightward-looking face If a face is detected in one image based on the forward-looking classifier model, then the comparison may involve determining whether the weakly detected face in the next image is also detected based on the forward-looking classifier model. If the weakly detected face is detected based on the leftward-looking or rightward-looking classifier model, then the comparison will fail. An advantage of this approach is that the classifier model information is available as a result of the object detection algorithm being applied.

It will be understood that where many classifier models are in use, the comparison may not require that the weakly detected object was detected based on exactly the same classifier model. It may be acceptable if the classifier model for the weakly detected object is within the same category of classifier models as the classifier model for the strongly detected object. For example, if there are several forward-looking classifier models, several leftward-looking classifier models and several rightward-looking classifier models, it may be acceptable for the specific classifier model for the weakly detected object to be in the same category as the classifier model for the strongly detected object. In that case, if the classifier model for the object detected in the previous image is leftward-looking model 3 (of 5, say), then the comparison may be affirmative if the classification model for the weakly detected object is leftward-looking model 4, since they are both leftward looking model classifiers.

It will also be understood that weightings may be applied such that the more similar the shapes are, the more importance it is given in the determination.

Colors

The characteristic can be color. If the color of the weakly detected object is similar to that of an object strongly detected in other images, then it may be determined that image data associated with the weakly detected object should be output for use in further training of the object detection algorithm.

Color may be determined in any convenient manner. In some cases, the object detection algorithm may determine color information associated with an object (or potential object) as part of its analysis. For example, if a color histogram of a second area or object (such as a weakly detected object) is determined to be sufficiently dissimilar to a color histogram of a first area or object (such as a strongly detected object), then the determination will fail.

It will also be understood that weightings may be applied such that the more similar the color information of the two areas or objects are, the more importance it is given in the determination.

Associated Objects

The characteristic can be based on multi-class object detection, applicable to object detection algorithms that enable multi-class classification. Such an approach involves splitting object into distinct parts. For example, a human "object" can be split into parts such as head, upper body, and full body. In this case different parts of the same object can be related for same object with certain probabilities, usually based on relative positions and geometric sizes of object parts.

Figure 7:
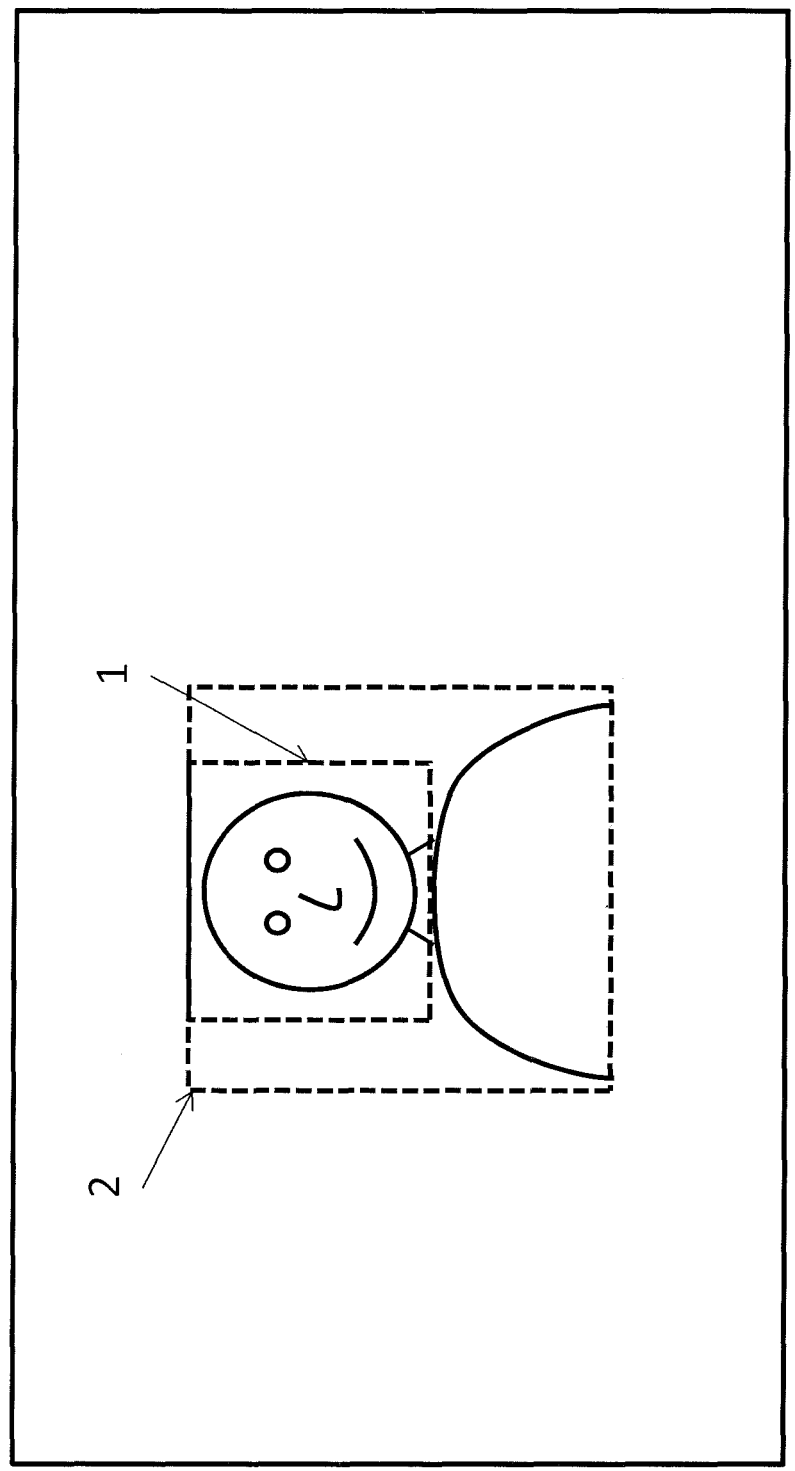
FIG. 7 shows an image in which two associated objects have been detected.

Referring to FIG. 7, a multi-class classification can include a head 701 and upper body 702 (the upper body includes the head and shoulders together). If a correlation can be determined between a weakly detected upper body 702 and a strongly detected head 701, then it may be determined that image data associated with the weakly detected upper body 702 should be output for use in further training of the object detection algorithm.

Outputting Image Data

As described above, it may be determined that image data associated with the second area is to be output for use in further training of the object detection algorithm.

The image data that is output can include the weakly detected object. If the object detection algorithm uses bounding boxes, it may be convenient to use the bounding box of the weakly identified object as a basis for generating the image data to be output. In the simplest form, the image data can simply be that within the bounding box. Alternatively, a region that contains the object (or bounding box) and a proportion of the surrounding area can be cropped from the image.

Figure 4:
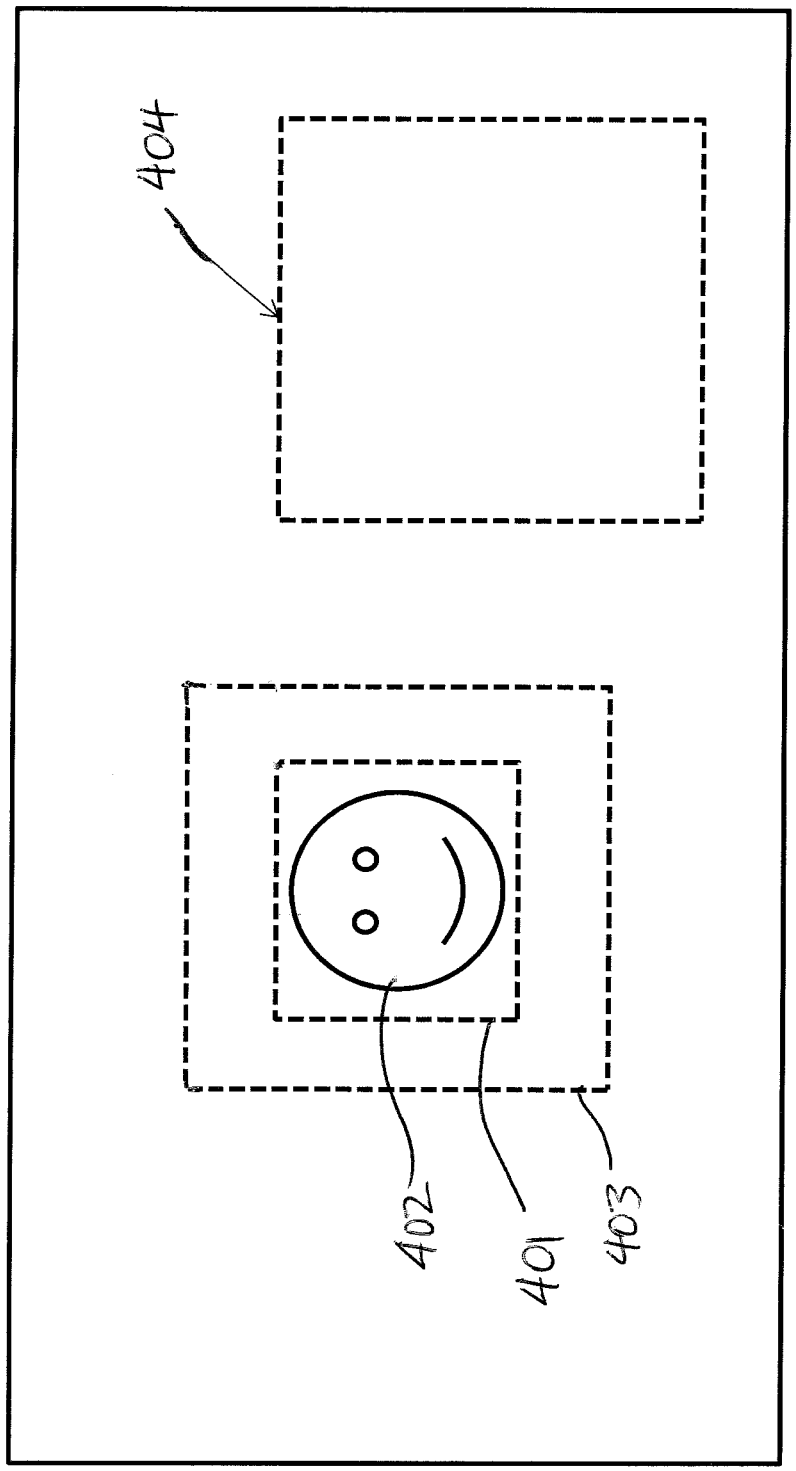
FIG. 4 shows an image with a detected object showing a bounding box.

FIG. 4 shows such a bounding box 401 of a weakly detected object 402. A crop region 403 is cropped from the image. The size of the crop region 403 relative to the object or bounding box size is determined in order to provide the most suitable sample for the training dataset. The size of the crop may be larger than the object by a certain size, to include object boundaries and eliminate edge distortion effects during feature vector calculation and to provide an appropriate amount of background for optimal use as a training sample.

It may be desirable to maintain a balanced dataset, in which the number of positive samples containing the object of interest is approximately matched with the number of negative samples not containing the object. In that case, the image data can also include a region of the image that does not contain the weakly detected object. For a crop region 403 containing a weakly detected object, another region 404 may be cropped from the same frame at a point distant from the weakly detected object of interest.

Updating Training Dataset and Re-Training Algorithm

Once image data is output, it can be added to a dataset. In an embodiment, the dataset to which the image data is added is the dataset that was used to train the object detection algorithm used to detect the weakly detected object, thereby to generate a revised dataset.

After the image data (and possibly other image data associated with subsequent weakly detected objects) has been added to the dataset, the object detection algorithm can be trained with the revised dataset, thereby to generate a revised object detection algorithm comprising a classifier that is updated with the new model. Since the dataset has now been enlarged to incorporate objects that are more appropriate to the actual use environment, the accuracy of the detection method should increase.

After an addition or a number of additions to the training dataset, it may be desirable to check the integrity of the dataset. In general, the dataset can be considered improved if the number of support vectors increases in proportion to the number of added samples, and the separability (ratio of true positives/negatives to false positives/negatives) does not decrease by a proportion much greater than the proportion of added samples. If the dataset is not found to be improved using the above criteria it may be rejected a priori.

In an embodiment, a performance of the original object detection algorithm is tested against the revised object detection algorithm. That testing may take any suitable form. In one embodiment, the testing comprises comparing a ratio of strong detections to weak detections occurring for example along a tracked object's trajectory, for the object detection model and the revised object detection model.

The ratio of strong detections to weak detections can be represented by, for example, the number of strong detections in an image or series of images, divided by the sum of the number of weak detections indicated by the second output.

In FIG. 3, which shows the output of the original object detection algorithm, this ratio is 5/8, because there are five strongly detected objects (represented by bounding boxes 301-304 and 8) and four weakly detected objects (represented by bounding boxes 305-307) that are on the trajectory 310. The weakly detected object represented by bounding box 310 is not on the trajectory 310 and so is not included in the ratio calculations.

Other tests can be used to determine whether the object detection algorithm has improved. In particular, the use of a ratio such as that described is not required. It is, however, useful for the test to involve determining how the number of weakly and strongly detected objects changes as a result of training the object detection algorithm with the revised dataset. It is particularly desirable that the test focus on weakly detected objects that have the required correlation described above (e.g., being on a trajectory, in the embodiment where this is the characteristic being considered).

If this ratio is higher for the revised object detection algorithm than for the original object detection algorithm, the revised object detection algorithm may be considered an improvement. Whichever test is used, if an improvement is noted, further image data associated with other weakly detected objects may be added to the revised dataset as described above, and the process iterated further. Iteration may continue until there are no further improvements.

If the test shows that there is a reduction in performance, it may be decided to revert to the object detection algorithm that was trained on the original dataset before the new image data was added.

Testing may be performed on images that were used as sources of image data for the training dataset, or on a new set of images that have not contributed image data to the dataset.

Figure 5:
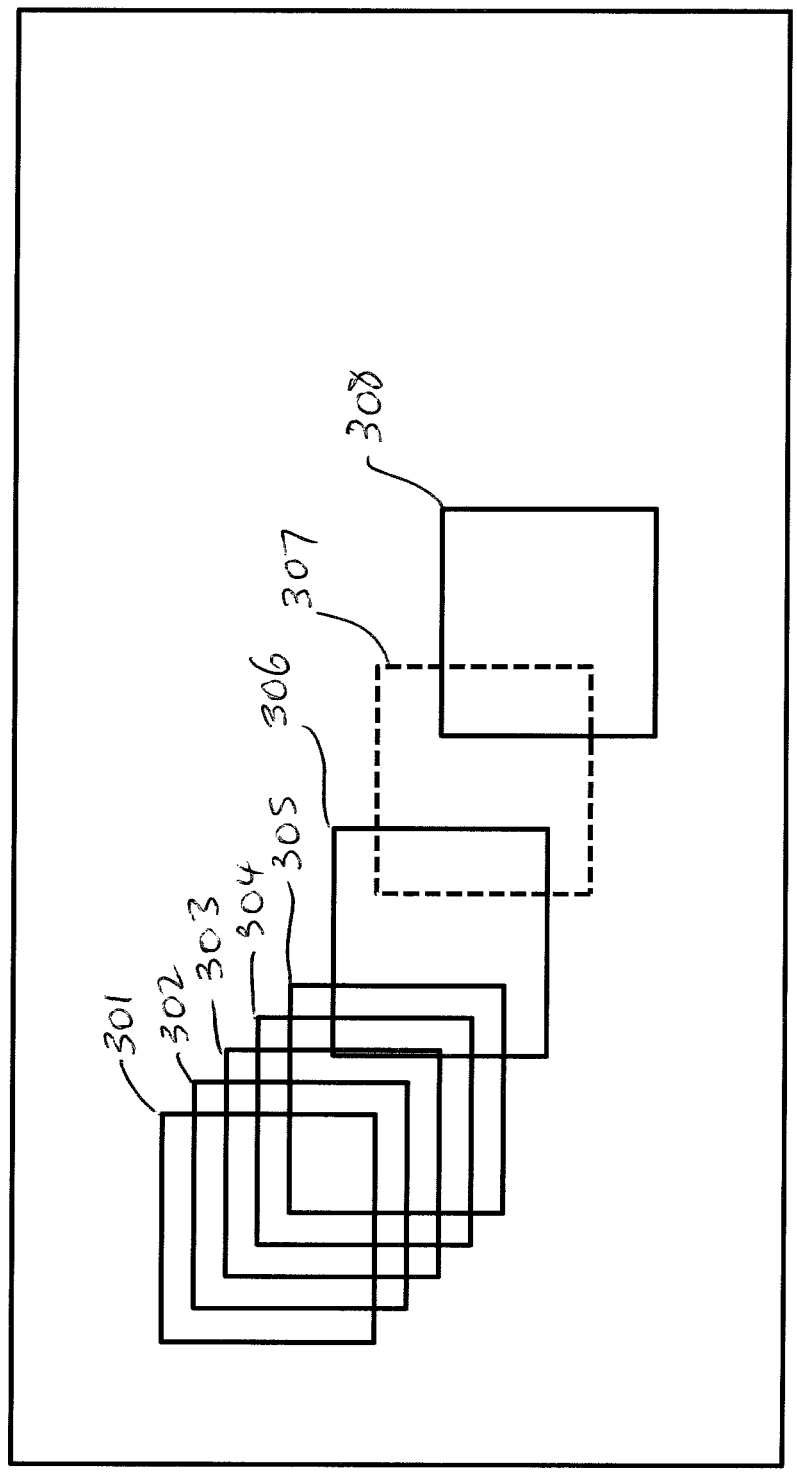
FIG. 5 shows an overlaid time-lapse image showing the movement of the detected object of FIG. 3 following re-training of the object detection algorithm.

FIG. 5 shows the application of the revised object detection algorithm to the same sequence of images as shown in FIG. 3. It will be noted that bounding box 309 is no longer weakly identified, as a result of the improved performance of the algorithm. Similarly, bounding boxes 305 and 306 are now strongly identified. The improvement in the algorithm has not resulted in bounding box 307 being strongly identified. The new ratio, calculated as described above, is 7/8.

The outcome of more than one test can be averaged. For example, using the ratio example above, the ratio can be determined for several different images (or image sequences where appropriate) and averaged. If the average increases as a result of the updated object detection algorithm, this may be considered an improvement. The averaging ideally should be performed over a significant number of images (or sequences of images) involving attempts to detect the same object type. For example, the averaging may be performed over 30 or more images (or sequences of images). A sequence in this context can refer to a set of images resulting in detections or potential detections of a particular object. The set of images can be a subset of a larger set of images, such as a video stream in which not all frames include an object that will be detected.

In the case where motion tracking is performed, the test can involve determining a ratio of a number of strongly detected objects on a trajectory to the sum of the number of weakly and strongly detected objects on the trajectory. The iterative process of retraining the model can be performed until there is no further improvement. Where averaging is used, improvement can be considered to have peaked when there is no increase in the average, or the track density decreases.

In some cases it may be desirable to apply the object detection (and tracking where relevant) method to raw sensor data, whereas the training dataset may be in a luminance or RGB or YUV representation. In this case the raw data in the region is transformed into the target representation by standard post-processing.

Figure 6:
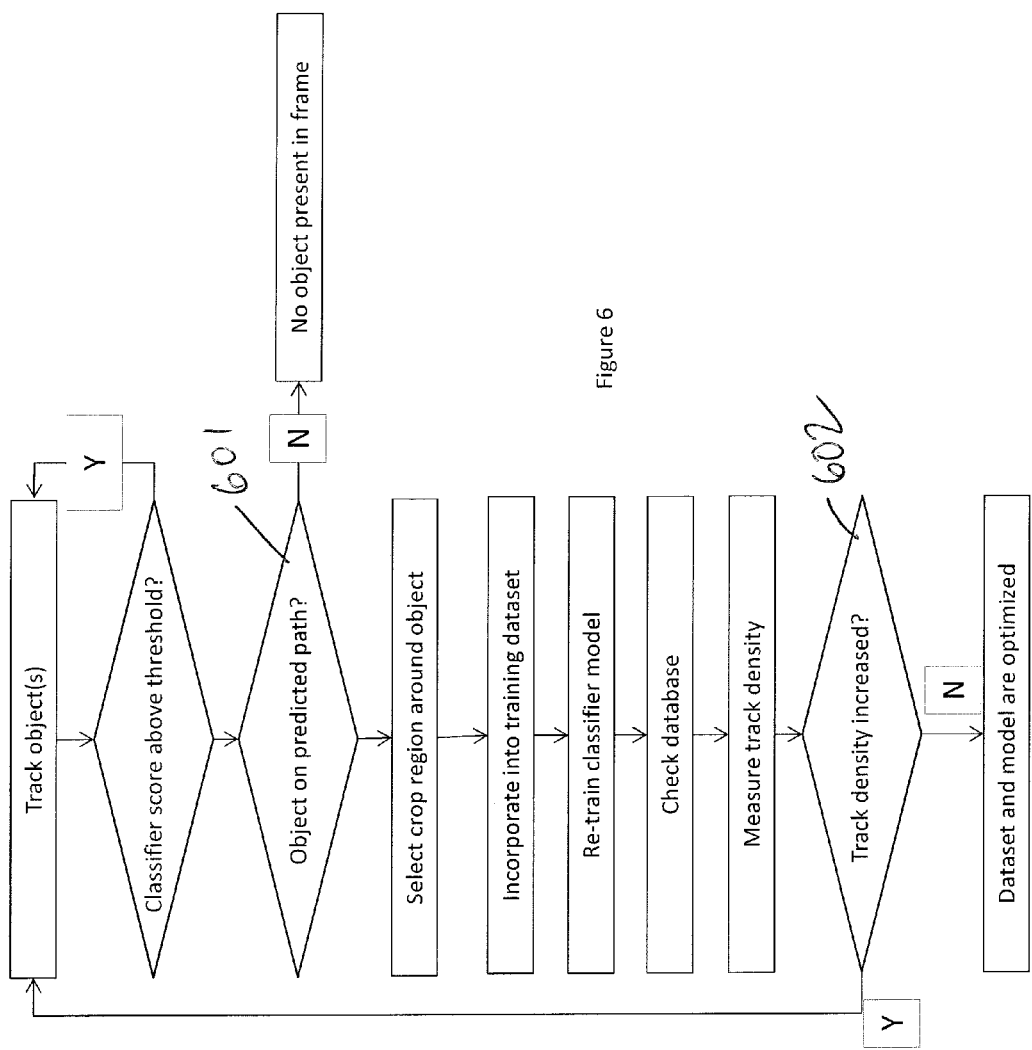
FIG. 6 shows a method of training an object detection algorithm.

FIG. 6 shows a method of iteratively improving the performance of an object detection algorithm. The "predicted path" in box 601 is the trajectory described elsewhere in this description. The "track density" referred to in box 602 is the ratio of strong detections to the sum of strong and weak detections described elsewhere in this description. The process is iterated until additional image data added to the training dataset no longer result in an increase in track density.

Other Embodiments

As mentioned above, it is possible to determine whether to output the image data based on more than one correlation. While any combination of characteristics can be used, it is desirable to combine correlation based on position estimation or object tracking with a further correlation, such as with object size, object shape, or object color.

The method may be performed within a device, such as a smartphone or a camera. Alternatively, different portions of the method may be applied in different devices that are in communication with each other. For example, images may be supplied from a memory to a general purpose computer programmed and configured to implement any of the methods described herein. Alternatively, some or all of what has been described can be performed within a device such as a smartphone or camera.

Figure 8:
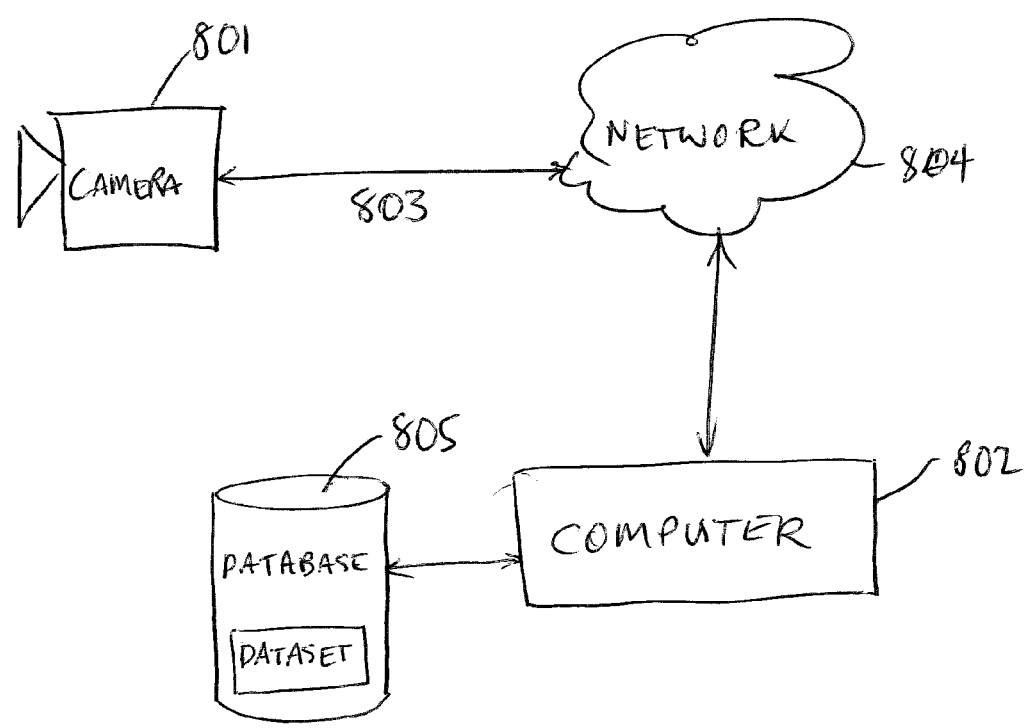
FIG. 8 shows a camera that outputs image data to a computer via a network.

In the embodiment shown in FIG. 8, a camera 801 attempts to detect the presence of an object as described above. The camera 801 can include circuitry such as image processing circuitry designed to implement an object detection algorithm as described above. Alternatively or in addition, the camera 801 can include software running on a general purpose processor or image processor. The camera circuitry can perform any additional processing required to determine whether to output image data, as described in detail above.

When it is determined that image data associated with a weakly detected object should be output, the camera sends the image data to a computer 802 over a connection 803, and network 804. The connections and network can be IP-based, but any suitable protocol(s) can be used.

The network can be a private network such as a Local Area Network (LAN) or a private network, and can involve wired or wireless portions. The computer 802 can access a database 805 that contains the dataset that was used to train the object detection algorithm used by the camera.

As described above, the computer 802 adds the received image data to the dataset. The skilled person will understand that additional pre-processing of the image data can be undertaken before it is added to the database. Any such pre-processing can take place in the camera or the computer.

The computer can periodically re-train the object detection algorithm using the revised dataset. This can be done at any suitable time, but conveniently this may be done once a particular number of new images has been added to the dataset, or a particular amount of time has passed since the last re-training. Re-training could also be done at times when the computer is under relatively low load, such as overnight in the event the computer receives image data from cameras used in areas that have little or no activity out of business hours, for example.

Once it is determined that re-training has resulted in improved performance of the original object detection algorithm, the revised object algorithm can replace the original object detection algorithm. Where the objection detection algorithm is implemented in a camera, the camera can be updated with the revised detection algorithm. In the example of FIG. 8, information required to update the object detection algorithm to the revised version can be sent to the camera 801 by the computer 802 via the network 804. In embodiments where the object algorithm is applied by the same computer that does the training, the object detection algorithm can be updated locally.

In an embodiment, all processing can be performed in a computer (or computers) remote from the camera. In that case, a video stream can be sent from a camera and processed by the computer, either on arrival or at some later point after storage. In either case, the images are processed, then image data associated with weakly detected objects is cropped and added to the dataset as described above.

Other Aspects of the Invention

The method can detect the first object in at least one image and detect a second object in a second image, thereby outputting first and second outputs to indicate a likelihood of the first and second object presence in the first and second area. The first object and the second object may be the same object, or different objects. The object's position may be estimated based on tracking of movement of the object within a sequence of images. The position can be estimated by analyzing at least one image, other than that containing the second area.

The position as estimated above may include the trajectory of the object, or a region of an image. The first area being analyzed and the second area being analyzed for objection detection may be in the same image, or may be in different images.

In this method, when image data of the second area of the image is outputted, the image data may include a region of the image that does not contain the second object. Alternatively, the image data outputted may comprise at least image data from the second area.

In improving performance of an object detection algorithm, testing the performance of the object detection algorithm may be based on the ratio of a number of first outputs compared to the sum of the number of second outputs and the number of first outputs.

The method of training an object detection algorithm may further comprise iterating the steps of adding the image data to the dataset, training the object detection algorithm, and testing the resulting revised object detection algorithm. The revised object algorithm can be rejected if the density decreases in comparison to the previous model. The process of updating the model can be iterated until the density of strong detections no longer increases. The density as discussed in this method can be obtained by determining the ratio of strong to weak detections over the lifespan of an object. The density may be averaged over a number of objects in a similar location or over a similar time period.

The method of analyzing an image may be performed where the object is the image of a person or a part thereof. Object detection may be performed on raw image sensor data. In this method, the size of a region may be selected to include the object occupying a predetermined fraction of the total size of the region.

The object detection method may be performed at a first location, while the resultant dataset is stored at a second location. The image data obtained from this method may be further processed before incorporation into a dataset. The processing may correspond to conversion from raw sensor data into luminance representation, or may correspond to conversion from raw sensor data into a 3-component colorspace.

Although the invention has been described with reference to a number of specific embodiments, it will be appreciated by the skilled person that the invention can be embodied in many other forms.

What is claimed is:

1. A method comprising detecting the presence of a first object and a second object in at least one image using an object detection algorithm that uses training image data to train the detection algorithm to detect a given object based at least in part on a similarity of appearance of image data in a corresponding area of a first image of the at least one image to data derived at least in part from the training image data, the method comprising:
providing a first output indicative of a relatively high similarity of appearance of at least part of a first area of the first image to data derived at least in part from the training image data, the first output indicating that a first detection confidence is sufficiently high to indicate that a first object is likely to have been detected in the first area;
determining a characteristic of a second area, of the first image or of a second image of the at least one image, in which an object may be detected, the characteristic being derived from data relating to the first area and being capable of indicating a likelihood of presence of a second object in the second area;
attempting to detect the presence of the second object in the second area;
responsive to a detection of the second object based on a similarity of appearance of at least part of the second area to data derived at least in part from the training image data, determining based on the determined characteristic whether to provide a second output indicating that a second detection confidence is sufficiently high to indicate that the second object is likely to be present in the second area;
outputting image data associated with the second area, the outputted image data being for use in further training of the object detection algorithm;
adding the outputted image data to a dataset that is used to train the object detection algorithm, thereby to generate a revised dataset;
training the object detection algorithm with the revised dataset, thereby to generate a revised trained object detection algorithm; and
testing a performance of the object detection algorithm against that of the revised trained object detection algorithm,
wherein:
the testing is based on determining a ratio of a number of first outputs to a number of second outputs,
the characteristic is proximity to a position,
the number of first outputs is the number of first objects having the first detection confidence and being within a predefined distance of the position, and
the number of second outputs is the number of second objects having the second detection confidence and being within the predefined distance of the position.

2. The method of claim 1, wherein the characteristic is based at least partly on at least one characteristic selected from the group consisting of:
a proximity of the second area to an estimated position of the second object within an image;
a size of the second object;
a shape of the second object;
a proximity of the first area to the second area;
a relative position of the first area to the second area; and
color information associated with the first object.

3. The method of claim 1, wherein the testing comprises applying the revised trained object detection algorithm to the dataset and examining separability of positive and negative detections or the number of support vectors for a support vector machine.

4. The method of claim 1, comprising:
testing a performance of the object detection algorithm against that of the revised trained object detection algorithm; and
if the performance of the revised trained object detection algorithm exceeds that of the object detection algorithm, replacing the object detection algorithm with the revised trained object detection algorithm.

5. The method of claim 4, further comprising iterating the steps of claim 4 with additional image data until performance of the revised trained object detection algorithm is no longer improved.

6. The method of claim 1, wherein a strength of similarity is determined by a strength of response of a classifier, the classifier being:
a support vector machine; or
a linear classifier.

7. The method of claim 1, wherein the indicated likelihood of presence of the second object is weak but not strong, the method further comprising training the object detection algorithm with the revised dataset, thereby to generate, from an object detection database comprising the dataset, a revised trained object detection database comprising the revised dataset.

8. The method of claim 7, further comprising testing whether performance of the revised trained object detection database is improved relative to that of the object detection database.

9. The method of claim 8, wherein the testing is based on determining a change in the number of strong detections and the number of weak detections of the object.

10. The method of claim 9, wherein the image data is added to the dataset based on a determination of a proximity of the weakly but not strongly detected object to a trajectory defined in relation to the image containing the second object.

11. The method of claim 10, wherein the testing comprises determining a change in density of strongly and weakly detected objects within a predefined distance of the trajectory.

12. A non-transitory computer-readable storage medium comprising computer-executable instructions which, when executed by a processor, causes a computing device to detect the presence of a first object and a second object in at least one image using an object detection algorithm that uses training image data to train the detection algorithm to detect a given object based at least in part on a similarity of appearance of image data in a corresponding area of a first image of the at least one image to data derived at least in part from the training image data, the detecting comprising:
  providing a first output indicative of a relatively high similarity of appearance of at least part of a first area of the first image to data derived at least in part from the training image data, the first output indicating that a first detection confidence is sufficiently high to indicate that a first object is likely to have been detected in the first area;
  determining a characteristic of a second area, of the first image or of a second image of the at least one image, in which an object may be detected, the characteristic being derived from data relating to the first area and being capable of indicating a likelihood of presence of a second object in the second area;
  attempting to detect the presence of the second object in the second area;
  responsive to a detection of the second object based on a similarity of appearance of at least part of the second area to data derived at least in part from the training image data, determining based on the determined characteristic whether to provide a second output indicating that a second detection confidence is sufficiently high to indicate that the second object is likely to be present in the second area;
  outputting image data associated with the second area, the outputted image data being for use in further training of the object detection algorithm;
  adding the outputted image data to a dataset that is used to train the object detection algorithm, thereby to generate a revised dataset;
  training the object detection algorithm with the revised dataset, thereby to generate a revised trained object detection algorithm; and
  testing a performance of the object detection algorithm against that of the revised trained object detection algorithm,
  wherein:
    the testing is based on determining a ratio of a number of first outputs to a number of second outputs,
    the characteristic is proximity to a position,
    the number of first outputs is the number of first objects having the first detection confidence and being within a predefined distance of the position, and
    the number of second outputs is the number of second objects having the second detection confidence and being within the predefined distance of the position.

13. A system for use in object detection, the system comprising at least one memory including computer program code, and at least one processor in data communication with the at least one memory, wherein the at least one processor is configured, when executing the program code, to detect the presence of a first object and a second object in at least one image using an object detection algorithm that uses training image data to train the detection algorithm to detect a given object based at least in part on a similarity of appearance of image data in a corresponding area of a first image of the at least one image to data derived at least in part from the training image data, the detecting comprising:
  providing a first output indicative of a relatively high similarity of appearance of at least part of a first area of the first image to data derived at least in part from the training image data, the first output indicating that a first detection confidence is sufficiently high to indicate that a first object is likely to have been detected in the first area;
  determining a characteristic of a second area, of the first image or of a second image of the at least one image, in which an object may be detected, the characteristic being derived from data relating to the first area and being capable of indicating a likelihood of presence of a second object in the second area;
  attempting to detect the presence of the second object in the second area;
  responsive to a detection of the second object based on a similarity of appearance of at least part of the second area to data derived at least in part from the training image data, determining based on the determined characteristic whether to provide a second output indicating that a second detection confidence is sufficiently high to indicate that the second object is likely to be present in the second area;
  outputting image data associated with the second area, the outputted image data being for use in further training of the object detection algorithm;
  adding the outputted image data to a dataset that is used to train the object detection algorithm, thereby to generate a revised dataset;
  training the object detection algorithm with the revised dataset, thereby to generate a revised trained object detection algorithm; and
  testing a performance of the object detection algorithm against that of the revised trained object detection algorithm,
  wherein:
    the testing is based on determining a ratio of a number of first outputs to a number of second outputs,
    the characteristic is proximity to a position,
    the number of first outputs is the number of first objects having the first detection confidence and being within a predefined distance of the position, and
    the number of second outputs is the number of second objects having the second detection confidence and being within the predefined distance of the position.

14. A camera for use in object detection, the camera comprising at least one memory including computer program code, and at least one processor in data communication with the at least one memory, wherein the at least one processor is configured, when executing the program code, to detect the presence of a first object and a second object in at least one image using an object detection algorithm that uses training image data to train the detection algorithm to detect a given object based at least in part on a similarity of appearance of image data in a corresponding area of a first image of the at least one image to data derived at least in part from the training image data, the detecting comprising:

providing a first output indicative of a relatively high similarity of appearance of at least part of a first area of the first image to data derived at least in part from the training image data, the first output indicating that a first detection confidence is sufficiently high to indicate that a first object is likely to have been detected in the first area;

determining a characteristic of a second area, of the first image or of a second image of the at least one image, in which an object may be detected, the characteristic being derived from data relating to the first area and being capable of indicating a likelihood of presence of a second object in the second area;

attempting to detect the presence of the second object in the second area;

responsive to a detection of the second object based on a similarity of appearance of at least part of the second area to data derived at least in part from the training image data, determining based on the determined characteristic whether to provide a second output indicating that a second detection confidence is sufficiently high to indicate that the second object is likely to be present in the second area;

outputting image data associated with the second area, the outputted image data being for use in further training of the object detection algorithm;

adding the outputted image data to a dataset that is used to train the object detection algorithm, thereby to generate a revised dataset;

training the object detection algorithm with the revised dataset, thereby to generate a revised trained object detection algorithm; and testing a performance of the object detection algorithm against that of the revised trained object detection algorithm, wherein:

the testing is based on determining a ratio of a number of first outputs to a number of second outputs, the characteristic is proximity to a position, the number of first outputs is the number of first objects having the first detection confidence and being within a predefined distance of the position, and the number of second outputs is the number of second objects having the second detection confidence and being within the predefined distance of the position.

* * * * *